United States Patent [19]
Chen et al.

[11] Patent Number: 5,698,160
[45] Date of Patent: Dec. 16, 1997

[54] LEAD-FREE ALLOYS FOR USE IN SOLDER BONDING

[75] Inventors: Ho Sou Chen, Lebanon; Sungho Jin, Millington; Mark Thomas McCormack, Summit, all of N.J.

[73] Assignee: Lucent Technologies Inc., Murray Hill, N.J.

[21] Appl. No.: 705,035

[22] Filed: Aug. 29, 1996

Related U.S. Application Data

[63] Continuation of Ser. No. 316,687, Sep. 30, 1994, abandoned.

[51] Int. Cl.$^6$ .................................................. C22C 13/00
[52] U.S. Cl. .................................................. 420/557; 420/589
[58] Field of Search ................................. 420/557, 589

[56] References Cited

U.S. PATENT DOCUMENTS

| | | | |
|---|---|---|---|
| 4,112,868 | 9/1978 | Nomaki et al. | 118/429 |
| 4,797,328 | 1/1989 | Boehm | 420/557 |
| 5,229,070 | 7/1993 | Melton | 420/557 |
| 5,242,658 | 9/1993 | Stevens | 420/557 |
| 5,256,370 | 10/1993 | Slattery | 420/557 |
| 5,346,775 | 9/1994 | Jin et al. | 428/614 |

FOREIGN PATENT DOCUMENTS

| | | |
|---|---|---|
| 302785 | 4/1994 | European Pat. Off. . |
| 612578 | 8/1994 | European Pat. Off. . |
| 622151 | 11/1994 | European Pat. Off. . |
| 3425290 | 1/1986 | Germany . |
| 80998 | 1/1920 | Switzerland . |
| 671079 | 4/1952 | United Kingdom ............ 420/557 |
| 747813 | 4/1956 | United Kingdom . |

OTHER PUBLICATIONS

McCormack, M, et al *Apl Phys Lett* 1994 (Abs) 65(9) pp. 1100–1102.

McCormack M et al *J Electron Mater* 1994 (Abs) 23(8) pp. 715–720.

McCormack, M. et al Appl Phys Lett 65 (9) pp. 1100–1102 29 Aug. 1994 Significantly Imp Mech Prop in Pbfree SnZn-Insolder.

*Primary Examiner*—Melvyn Andrews
*Attorney, Agent, or Firm*—Richard J. Botos

[57] ABSTRACT

According to the present invention, an article of manufacture is provided having at least one region which includes a lead-free solder composition. The lead-free solder composition comprises an alloy of at least 50 wt. % tin and 7–30 wt. % zinc. An effective amount of silver is added to increase the ductility of the resultant alloy at least 25% over the ductility of the binary eutectic tin-zinc alloy. In a further embodiment, the present invention provides alloys useful in articles comprising lead-free solder compositions. The alloys include at least (8.0+y) wt. % zinc, 0.25 y to 0.5 y wt. % silver and at least 50 wt. % tin where y is from 0.2 to 22.

4 Claims, 4 Drawing Sheets

AMOUNT OF Ag NEEDED TO MAINTAIN NEAR-EUTECTIC MELTING IN Sn-Zn-Ag ALLOYS

AMOUNT OF Ag NEEDED TO MAINTAIN NEAR-EUTECTIC MELTING IN Sn-Zn-Ag ALLOYS 5,698,160

1

LEAD-FREE ALLOYS FOR USE IN SOLDER BONDING

This application is a continuation of application Ser. No. 08/316,687, filed on Sep. 30, 1994, now abandoned.

FIELD OF THE INVENTION

The invention relates to articles which include lead-free alloys and, more particularly, lead-free alloys in the tin-zinc system which include additives of silver.

BACKGROUND OF THE INVENTION

Solder bonding is a critical step in many industrial processes. In optical and microelectronic device technologies, manufacturing yields and service lifetimes often depend upon the integrity of small solder joints. Current solder compositions typically include lead, the most common being compositions based on the eutectic 63 wt. % tin- 37 wt. % Pb alloy. However, the toxicity of lead renders lead-based solders undesirable from a health and environmental standpoint.

In the search for viable replacement solders, the mechanical properties of the solder bond must be considered. While high strength is desirable, breakage due to poor strength is not the only manner in which solder joints fail. Solder compositions based on alloys with poor ductility tend to exhibit brittle fractures and poor fatigue characteristics.

Recently, research efforts have focused on lead-free alloys for use in solder compositions. See, for example, the series of articles in *Journal of Metals*, Vol. 45, July, 1993 and in *J. Elect. Mater,* Vol. 23, No. 8, August, 1994, the disclosures of which are incorporated by reference herein. Other lead-free solder alloys are described in U.S. application Ser. No. 08/255,687 which issued as U.S. Pat. No. 5,509,815 on Apr. 23, 1996 and U.S. application Ser. No. 08/284,028, which was abandoned in favor of Ser. No. 08/368,728 which was abandoned in favor of U.S. Ser. No. 08/502,941 which was allowed Feb. 15, 1996 the disclosures of which are incorporated by reference herein. An alloy based on the eutectic 91.2 wt. % tin-8.8 wt. % Zn alloy is a known lead-free solder that has a melting point of 199.5° C., comparable to the 183° C. melting point of the eutectic tin-lead alloy. However, the eutectic tin-zinc alloy lacks the ductility needed for many solder applications. There is a need in the art for a tin-zinc based alloy having improved ductility while retaining the desirable melting characteristics of the eutectic tin-zinc alloy.

SUMMARY OF THE INVENTION

According to the present invention, an article of manufacture is provided having at least one region which includes a lead-free solder composition. The lead-free solder composition comprises an alloy of at least 50 wt. % tin and 7–30 wt. % zinc. An effective amount of silver is added to increase the ductility of the resultant alloy at least 25% over the ductility of the binary eutectic tin-zinc alloy.

In a further embodiment, the present invention provides alloys useful in articles comprising lead-free solder compositions. The alloys include at least 50 wt. % tin and (8+y) wt. % zinc. Silver is added in an amount from 0.25 y to 0.5 y wt. % where y is from 0.2 to 22.

In a further embodiment, a lead-free alloy is provided comprising 59–82 wt. % tin, 2–11 wt. % silver and 16–30 wt. % zinc.

DETAILED DESCRIPTION

Figure 1:
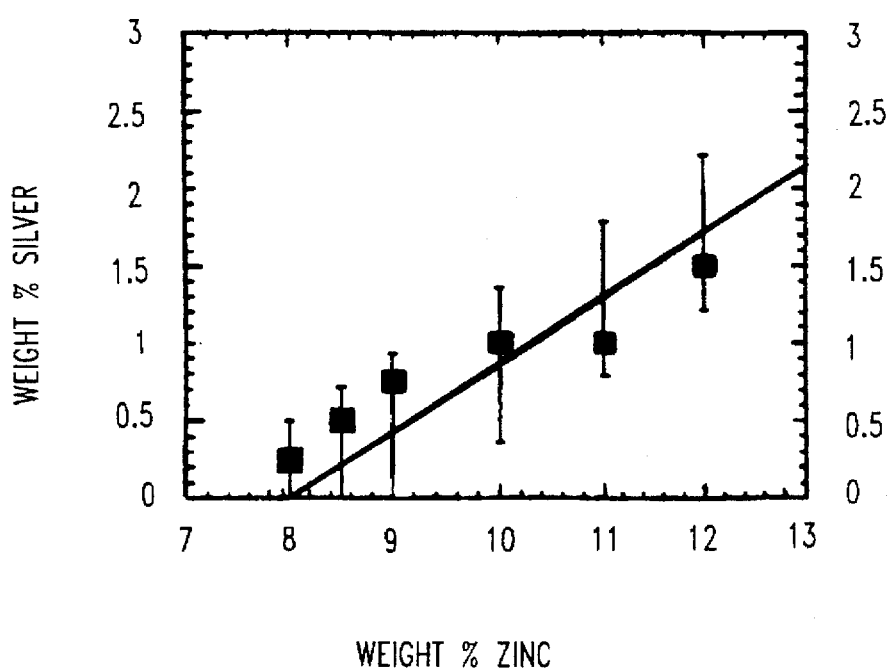
FIG. 1 is a plot of the amount of silver needed to maintain near-eutectic melting for tin-zinc-silver alloys.

The present invention provides improved lead-free alloys in the tin-zinc system having particular utility for solder applications. Surprisingly, it has been discovered that the addition of specific amounts of silver to tin-zinc alloys significantly improves mechanical properties, particularly ductility, while preserving the deskable melting characteristics of the eutectic tin-zinc alloy.

The eutectic 91.2 wt. % tin- 8.8 wt. % zinc binary alloy melts at 199.5° C. Additionally, there is a eutectic tin-silver binary alloy having a composition of 96.5 wt. % tin-3.5 wt. % silver which melts at 221° C. Because it is known that there is almost no solid solubility of silver in tin, additions of silver to the tin-zinc binary eutectic can result in $Ag_3Sn$ precipitates, creating a measurable volume fraction of the Sn-Ag eutectic composition. Such a condition changes the melting character of the alloy so that some portion of the alloy volume undesirably melts at or near the 221° C. melting point of the Sn-Ag eutectic. Unexpectedly, it has been discovered that, when added in the correct ratio, silver selectively combines with zinc, instead of tin to form zinc-rich, zinc-silver precipitates. These precipitates are believed to be the epsilon phase of the zinc-silver alloy system, a phase having a wide compositional range from about 55–80 wt. % zinc.

Because the added silver depletes zinc from the tin-zinc binary phase, the mount of silver added depends on the amount of zinc in the alloy in order to preserve the melting characteristics of the eutectic tin-zinc composition. For tin-zinc compositions having less than approximately 9 wt. % zinc, approximately 0.1–1.0 wt. % silver is added. Addition of more than approximately 1–1.5 wt. % silver to alloys having less than 9 wt. % zinc results in undesirable formation of a measurable volume fraction of Sn-Ag eutectic composition and $Ag_3Sn$ precipitates which have elevated melting temperatures as compared to the eutectic tin-zinc phase, discussed above.

For alloy compositions having zinc contents greater than approximately 9.0 wt. %, silver is added in an amount sufficient to deplete the excess zinc through formation of zinc-silver precipitates. The addition of an optimized amount of silver to tin-zinc compositions of greater than 9 wt. % zinc desirably causes silver to combine with the surplus zinc, thereby resulting in a liquidus temperature near the 199.5° C. solidus temperature, as in the binary tin-zinc eutectic composition. As the zinc content increases beyond 9 wt. %, greater amounts of silver are required to combine with all the excess zinc, to form the grain-refining Zn-Ag precipitates and lower the liquidus temperature to yield a more eutectic-like melting character. If insufficient or excess silver is added, the melting temperature (i.e., liquidus temperature) becomes higher than the eutectic Sn-Zn temperature, which is undesirable. Furthermore, the presence of an excess of the non-eutectic, large-grained primary phase (either Sn-rich or Zn-rich) in the otherwise very fine and uniform eutectic microstructure is detrimental to the mechanical properties.

To determine the amount of silver necessary to deplete the excess zinc, the weight percent of the excess zinc is multiplied by weight percent ratio of silver to zinc in the zinc-silver precipitates. For a 10 wt. % zinc alloy, in which the zinc-silver precipitate composition is nominally 70 wt. % Zn- 30 wt. % Ag, the excess zinc is 10%-8%=2% (the approximate starting point for the near-eutectic ternary tin-zinc-silver compositions). Multiplying the 2% by the ratio of silver to zinc in the precipitates, ;70

, i.e., 3/7, yields 0.86 weight percent silver needed to combine with the 2% excess zinc. However, because this calculation is approximate, based on estimates of the zinc composition for the eutectic ternary alloy and the zinc-silver precipitate composition, an error of approximately plus or minus 0.5 wt. % silver is provided for the calculated silver content. More generally, the alloys of the present invention possess compositions in the range:

Zn: (8.0+y) wt. %
Ag: 0.25 y to 0.5 y wt. % where y is 0.2 to 22
Sn: balance

In an exemplary embodiment, y ranges from 0.2 to 5. In another exemplary embodiment, y ranges from 8–22. In a further exemplary embodiment, silver ranges from 0.35 y to 0.45 y with y in the range of 0.2 to 5. The value of y is derived from a composition representing the phase in which Ag is favorably combined with Zn to produce a beneficial, i.e., more eutectic-like, liquidus temperature. This phase is approximately Ag: 20–45% with Zn: 55–80%.

Exemplary alloys according to the present invention include 7–13 wt. % zinc, at least 85 wt. % tin, and silver in an amount effective to increase the ductility of the resultant alloy at least 25% over the ductility of the binary eutectic tin-zinc alloy. A further exemplary alloy is 59–82 wt. % tin, 16–30 wt. % zinc, and 2–11 wt. % silver, corresponding to a range for y of 8 to 22.

Silver additions to tin-zinc alloys according to the present invention dramatically increase the ductility of the resultant alloy. As measured by the total elongation to failure, the ductility of the inventive alloys is increased by at least 25% up to approximately 100% over that of the binary tin-zinc alloy. While not being bound by any particular theory or mechanism, it is believed that this very large and unexpected increase in ductility is due to the small effective grain size of the alloy combined with the zinc-silver precipitates. Typically, the grain size is 20–50% that of the binary eutectic tin-zinc alloy. The small effective grain size permits deformation to initially proceed easily in a given small volume of the alloy. Small amounts of the copper, gold, or palladium may be added in conjunction with silver with no deleterious effects.

Surprisingly, the formation of zinc-silver precipitates does not strengthen the resultant alloy but instead lowers the ultimate tensile strength (UTS) for near-eutectic compositions. Such an alloy softening effect is rarely seen in metal alloys. Strength reduction is desirable for stress relaxation of solder joints and to minimize cracking of solder/metallization interfaces. According to the present invention ultimate tensile strength is decreased at least 25% over the binary eutectic tin-zinc alloy.

As used herein, the expression "near-eutectic" refers to those alloys having liquidus temperatures within 10° C. and, preferably, 5° C., of the 199.5° C. binary eutectic tin-zinc liquidus temperature. While not being bound by any particular mechanism, it is believed that the decrease in strength is caused by decreased effective grain size of the inventive tin-zinc-silver alloys upon solidification. Such a microstructure permits deformation to proceed more readily at high homologous temperatures, $T/T_m$ (e.g., a relatively low temperature of 25° C., results in a relatively high homologous temperature for these low melting point alloys: $T/T_m$ is 298 K/472.5 K=0.63). At such high homologous temperatures, creep-related mechanisms such as grain boundary sliding and rotation, matrix and grain boundary diffusional creep and recovery, and easier dislocation glide and climb may lead to greater ductility with smaller grain sizes.

Tin-zinc-silver alloys according to the present invention can be prepared by any technique which effectively mixes the alloy constituents. Such techniques include, but are not limited to, melting a mixture of elements or partially alloyed elements, preferably in an inert atmosphere. The alloys can also be prepared during deposition of thin or thick films by electroplating, electroless plating, electrophoresis, chemical vapor deposition, evaporation, and sputtering. These techniques are also used to deposit films of the formed alloys onto a variety of substrates.

The alloys of the present invention are used to form solder compositions. Such solder compositions typically employ the alloy in conjunction with additives such as solder flux. Solder compositions are shaped, through appropriate techniques, into wires, ribbons, preforms, pastes or creams. The solders are typically used in a variety of articles, especially electrical articles such as electronic components, modules, and packages solder-bonded to a printed wiring board. The article surfaces which the solder contacts are optionally provided with a zinc-containing surface to enhance bonding, as described in U.S. patent application Ser. No. 08/299,471, the disclosure of which is incorporated by reference herein. Solder patterns are printed on the article in a desired pattern prior to soldering or are provided during the soldering process itself. Any soldering technique can be employed in conjunction with solder compositions including alloys of the present invention. Such soldering techniques include, but are not limited to, wave soldering, dip soldering, laser soldering, and reflow soldering.

The following Examples describe the formation and mechanical properties of alloys formed according to the present invention:

EXAMPLE 1

A series of alloys comprising tin, zinc, and silver were prepared from the pure elements (greater than 99.99% pure). The constituent elements were melted in a quartz tube having an inside diameter of 14 mm under an argon atmosphere. The molten alloys were homogenized at 800° C. for 8 hours, repeatedly shaken every hour, then air-cooled. The resultant ingots were swaged to form a 3.7 mm diameter rod. Sample pieces of 10–20 mg were cut from the mid-portion of the rod. To determine the melting characteristics of the alloys, differential scanning calorimetry (DSC) was performed on the samples in a nitrogen atmosphere. Heating and cooling rates were 10° C./minute and 5° C./minute, respectively. The liquidus and solidus temperatures, ±1° C., were determined and are listed in Table 1 (percentages are weight percent).

TABLE 1

| % Sn | % Zn | % Ag | solidus T (°C.) | liquidus T (°C.) |
| --- | --- | --- | --- | --- |
| 92 | 8 | 0 | 199.5 | 202 |
| 91.75 | 8 | 0.25 | 199.5 | 199.5 |
| 91.5 | 8. | 0.5 | 199.5 | 204 |
| 91 | 8 | 1.0 | 199.5 | 210 |
| 91.5 | 8.5 | 0 | 199.5 | 201 |
| 91.25 | 8.5 | 0.25 | 199.5 | 199.5 |
| 91 | 8.5 | 0.5 | 199.5 | 199.5 |

TABLE 1-continued

| % Sn  | % Zn | % Ag | solidus T (°C.) | liquidus T (°C.) |
|-------|------|------|-----------------|------------------|
| 90.5  | 8.5  | 1.0  | 199.5           | 203              |
| 89    | 8.5  | 2.0  | 199.5           | 221              |
| 88    | 8.5  | 3.0  | 199.5           | 221              |
| 91    | 9    | 0    | 199.5           | 199.5            |
| 90.75 | 9    | 0.25 | 199.5           | 199.5            |
| 90.5  | 9    | 0.5  | 199.5           | 199.5            |
| 90    | 9    | 1.0  | 199.5           | 207              |
| 89.5  | 10   | 0.5  | 199.5           | 207              |
| 89    | 10   | 1.0  | 199.5           | 199.5            |
| 88.5  | 11   | 0.5  | 199.5           | 207              |
| 88    | 11   | 1.0  | 199.5           | 199.5            |
| 87.5  | 12   | 0.5  | 199.5           | 225              |
| 87    | 12   | 1.0  | 199.5           | 211              |
| 86.5  | 12   | 1.5  | 199.5           | 199.5            |
| 86    | 12   | 2    | 199.5           | 205              |
| 85.5  | 12   | 2.5  | 199.5           | 208              |
| 86    | 13   | 1.0  | 199.5           | 220              |
| 85.5  | 13   | 1.5  | 199.5           | 206              |
| 85.2  | 13   | 1.8  | 199.5           | 199.5            |
| 83.5  | 15   | 1.5  | 199.5           | 224              |
| 83    | 15   | 2.0  | 199.5           | 210              |
| 82.33 | 15   | 2.67 | 199.5           | 199.5            |
| 82    | 15   | 3    | 199.5           | 202              |
| 81.5  | 15   | 3.5  | 199.5           | 208              |
| 78    | 20   | 2.0  | 199.5           | 247              |
| 75.2  | 20   | 4.8  | 199.5           | 203              |
| 62.5  | 30   | 7.5  | 199.5           | 204              |
| 61.5  | 30   | 8.5  | 199.5           | 207              |
| 60.5  | 30   | 9.5  | 199.5           | 209              |

From the results given in Table 1, the amount of silver (within approximately 0.5 wt. % silver) necessary to maintain the eutectic-like melting character of Sn-Zn-Ag alloys is given by:

0.25 y to 0.5 y wt. % where y is 0.2 to 22.

The calculated near-eutectic compositions for 8%, 8.5%, 9%, 10%, 11% and 12% zinc respectively require 0.5%, 0.21%, 0.43%, 0.86%, 1.29% and 1.71 wt. % silver (plus or minus 0.5%).

FIG. 1 illustrates the mount of silver needed for the near-eutectic composition. The solid curve assumes a silver-zinc precipitate composition of 30 wt. % silver, i.e., a silver content of 0.43y. Deviations from the solid curve are believed to be due to expected slight deviations from the assumed 70 wt. % Zn-30 wt. % Ag composition of the Zn-Ag precipitates.

The mechanical properties of the alloys listed in Table 1 were also determined. The swaged rods were cut into 4-inch sections and remelted within 4 mm diameter quartz tubes and forced-air-cooled. The resultant samples were machined into tensile test specimens with 0.5-inch gauge length and 0.120-inch gauge diameter. Room temperature tensile tests were performed at a strain rate of $1.0 \times 10^{-3}$ sec$^{-1}$.

EXAMPLE 2

Figure 2:
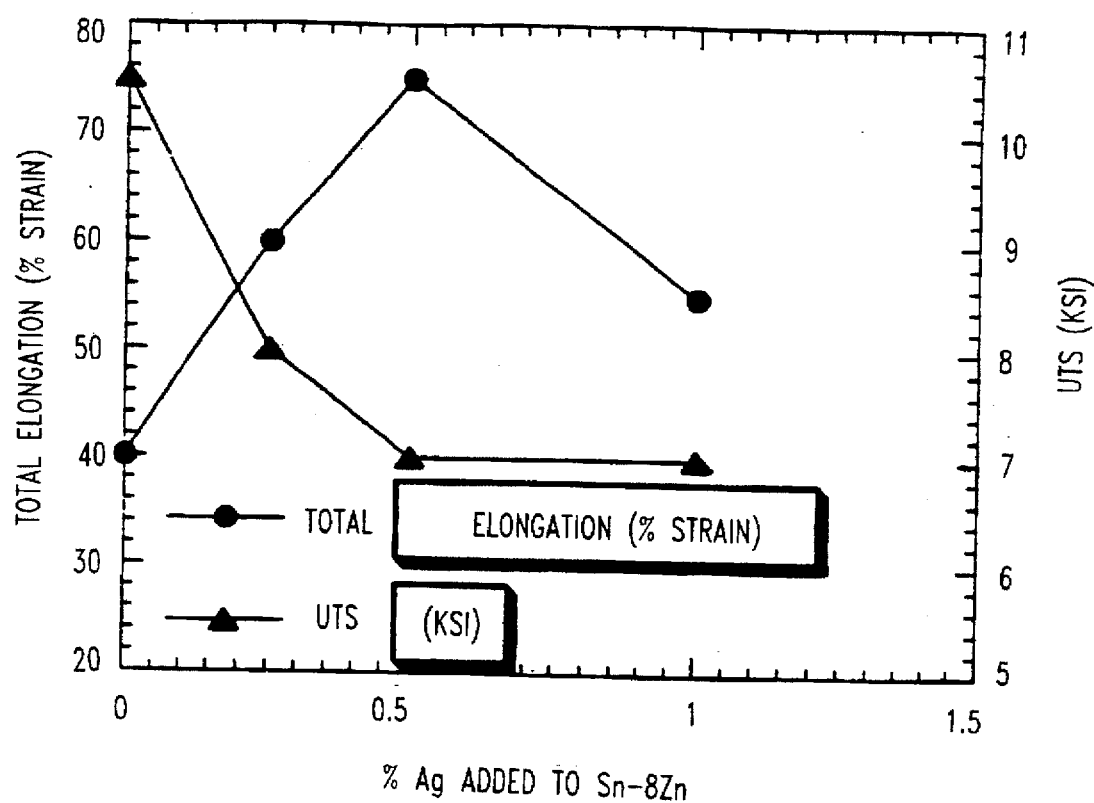
FIG. 2 shows the effect of silver additions on ductility and strength of a tin-8 wt. % zinc alloy.

Tensile tests were performed as described in Example 1 for Sn-8 wt. % Zn alloys with 0%, 0.25%, 0.5%, and 1.0 wt. % Ag additions. The strength and ductility results are shown in the composite plot of FIG. 2. The strength of the alloy steadily decreases from 10.5 ksi to 7 ksi, a decrease of 33%, at 0.5 wt. % Ag. The ductility correspondingly increases to a peak value of 75% at approximately 0.5 wt. % Ag, an 88% increase over the 40% elongation for the corresponding alloy with no silver addition. For additions of silver beyond 0.5 wt. % to 1.0%, the strength does not change and the ductility decreases to values approaching that of the alloy without silver.

Figure 3:
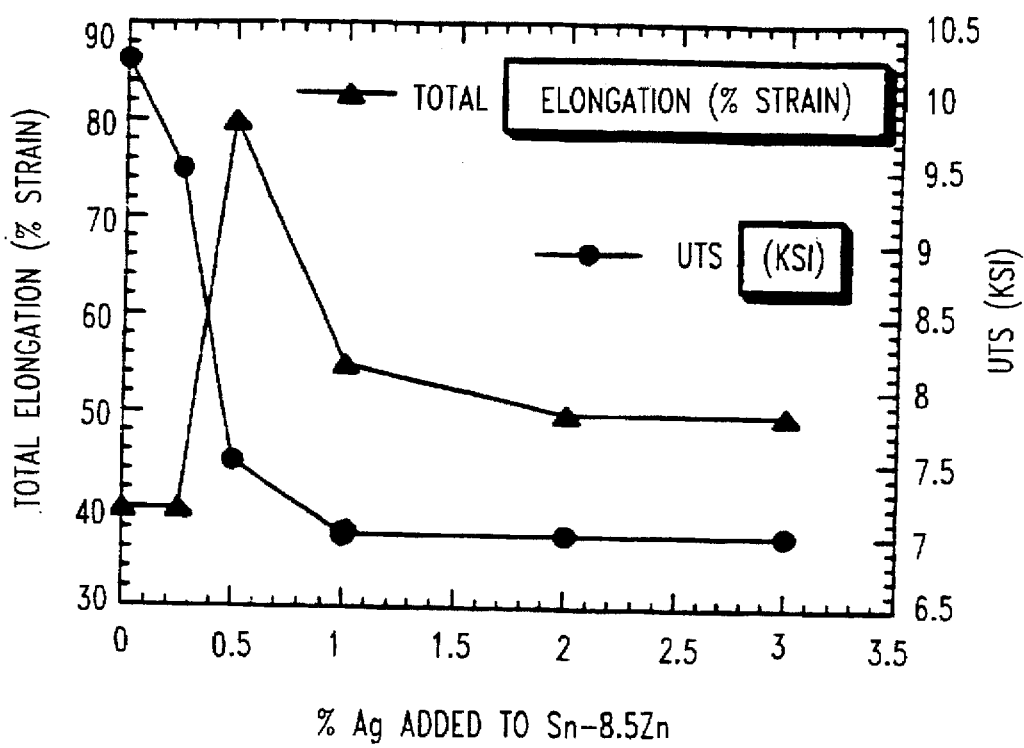
FIG. 3 shows the effect of silver additions on ductility and strength of a tin-8.5 wt. % zinc alloy.

EXAMPLE 3:

The ultimate tensile strength (UTS) and total elongation to failure for Sn-8.5 wt. % Zn alloys with 0%, 0.25%, 0.5%, 1%, 2%, and 3% silver additions are shown in the composite plot of FIG. 3. The strength of the alloys is shown to steadily decrease from 10.25 ksi to 7 ksi, a decrease of 32% for 1.0 wt. % Ag. The ductility correspondingly increases to a peak value at approximately 0.5 wt. % Ag to 80% elongation from 40% elongation, an increase of 100%. With additions of silver beyond 1–3 wt. %, the strength does not change and the ductility decreases to values approaching that of the alloy without silver.

EXAMPLE 4

Figure 4:
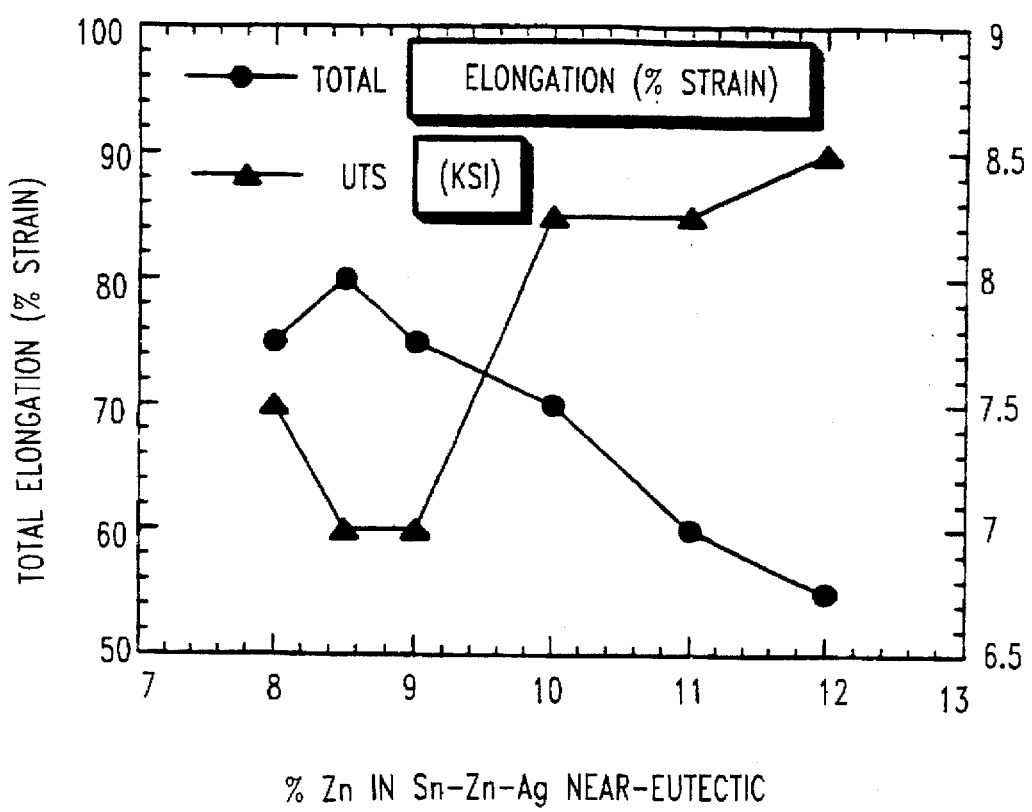
FIG. 4 shows the effect of zinc concentration on ductility and strength for near-eutectic tin-zinc-silver alloys.

The ultimate tensile strength (UTS) and total elongation to failure for the near-eutectic alloys described in Example 1 are shown in the composite plot of FIG. 4. The strength and ductility of the alloys approaches that of the binary tin-zinc near-eutectic alloys at zinc contents beyond 12%.

While the foregoing invention has been described in terms of the above detailed embodiments, it will be readily apparent that various modifications and changes can be made. Accordingly, modifications such as those suggested above, but not limited thereto are considered to be within the scope of the claimed invention.

We claim:

1. An article of manufacture having at least one region which includes a lead-free solder composition comprising an alloy consisting of:

59–82 wt. % tin;

16–30 wt. % zinc; and

2–11 wt. % silver.

2. An article of manufacture having at least one region which includes a lead-free solder composition comprising an alloy consisting of:

at least 85 wt. % tin;

7–13 wt. % zinc; and silver in an amount effective to maintain the melting temperature of the resultant alloy within the range of 189.5° C. to 209.5° C.

3. An article of manufacture according to claim 2 wherein silver is in an amount effective to maintain the melting temperature of the resultant alloy within the range of 194.5° C. to 204.5° C.

4. An article of manufacture having at least one region which includes a lead-free solder composition comprising and alloy consisting of:

at least 85 wt. % tin;

7–13 wt. % zinc; and silver in an amount effective to decrease the ultimate tensile strength of the resultant alloy at least 25% over the binary eutectic tin-zinc alloy.

\* \* \* \* \*